Figure 4:
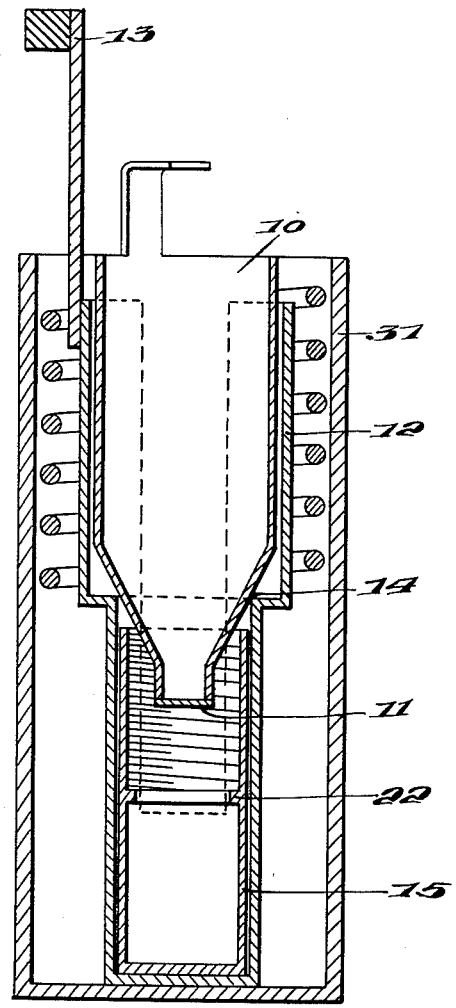

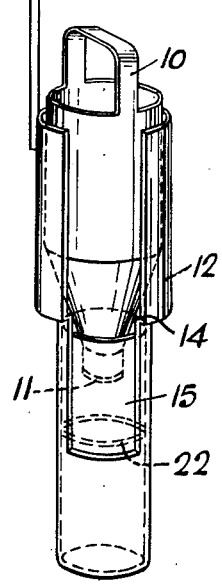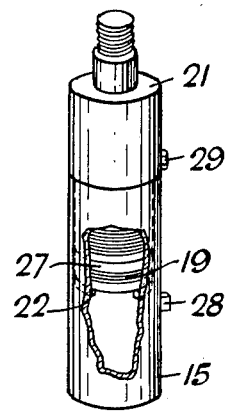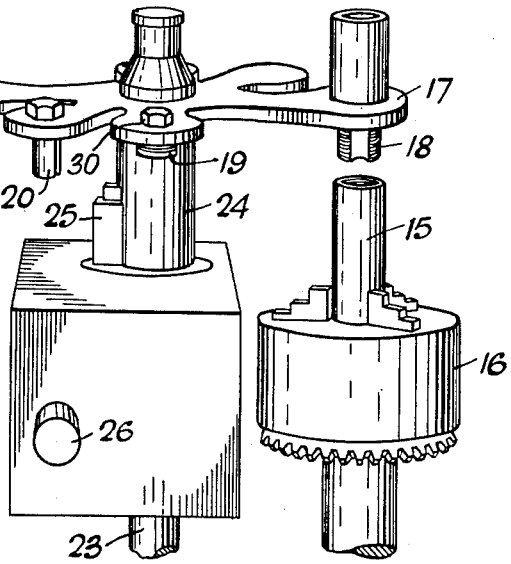

United States Patent Office 3,066,728
Patented Dec. 4, 1962

3,066,728
METHOD OF CONVERTING A SOLUTION OF A RADIOACTIVE SALT INTO COMPACT SOLID FORM
Benjamin Frank Warner, James Henry Tonkin, and David Shaw, Seascale, Cumberland, England, assignors to United Kingdom Atomic Energy Authority, London, England
Filed Oct. 18, 1957, Ser. No. 690,933
Claims priority, application Great Britain Nov. 20, 1956
1 Claim. (Cl. 159—1)

This invention relates to a method of converting a solution of a radio-active salt into compact solid form and has for object to provide a method which can be operated remotely when the radiations emitted by the salt are dangerously high. It is also an object of the invention to provide an intense, readily calibrated source of gamma radiation in a form suitable for teletherapeutic use.

According to the invention a method of converting a solution of radio-active salt into compact solid form comprises evaporating the solution to dryness at one temperature in a funnel sealed by a fusible plug blocking entry to a capsule, and subsequently heating at a higher temperature to fuse the plug and the salt so that the salt enters the capsule.

The invention will now be described with reference to the accompanying drawings wherein FIGS. 1, 2 and 3 are perspective views and FIG. 4 is a sectional view of the assembly shown in FIG. 1 disposed in a furnace.

In FIG. 1 a platinum funnel 10 sealed at its base with a plug of gold foil 11 is supported in a cradle 12 having a lifting and locating handle 13. The funnel 10 rests on a ledge 14 in the cradle 12 and enters the mouth of a platinum capsule 15 also held in the cradle 12. The capsule 15 has an internal screw thread extending to about the mid-point of the capsule where it terminates in a ledge 22. An aqueous solution of caesium sulphate is fed into the platinum funnel 10 which is then heated by an infrared heater to evaporate the solution to dryness. When evaporation is complete the funnel 10 and associated parts are transferred to a vertical tubular platinum wound furnace 31 (FIG. 4) and the temperature is raised to melt the caesium sulphate and the gold foil 11. As the gold foil melts the molten caesium sulphate runs into the capsule 15 where it again solidifies.

The capsule 15 may be sealed by means of the apparatus shown in FIG. 2. The platinum capsule 15, containing solid caesium sulphate is removed from the cradle 12 by a remotely-operated handling tool and placed in a rotatable scroll chuck 16 below a star shaped tool plate 17 carrying a plug tap 18, platinum screw plug 19 (held in the plate 17 by a nut 30), screw driver 20 and uranium plug 21. The tool plate 17 is rotated by a shaft 23 and is supported on a column 24 movable by a rack 25 and a rack operating shaft 26. To seal the capsule 15 the tool plate is adjusted so that the plug tap 18 is directly over the capsule 15 and the scroll chuck 16 is rotated around the plug tap 18 to clean caesium sulphate from the internal screw thread of the capsule 15. The plug tap 18 is withdrawn, the tool plate 17 is moved to its next position and the platinum screw plug 19 is screwed into the capsule 15 by again rotating the scroll chuck 16. The nut 30 holding the screw plug 19 in the tool plate 17 is then removed by means of a remotely operated spanner and the screw plug 19 is run down inside the capsule 15 to the ledge 22 by use of the screwdriver 20 inserted in a groove in the upper face of the screw plug 19 which also carries a braze metal ring 27 at its upper end (FIG. 3). Finally the uranium plug 21 "which has a close fit in a sleeve in the tool plate 17," is screwed into the capsule 15 by means of a remotely operated manipulator (to act as a shield) and the assembly is heated to melt the braze metal ring 27, which runs into the surrounding screw threads and seals the platinum screw plug 19 and uranium plug 21 in the capsule 15. The assembled capsule 15 and uranium plug 21 are shown in FIG. 3 with part of the capsule 15 cut away. Locating keys 28, 29 are shown. These keys are provided to orientate the capsule when in use.

We claim:

In a device for evaporating a radioactive salt solution and transferring the solute to a capsule, the combination comprising a cradle having a bottom wall, sidewalls and an open upper end, a capsule having an open upper end fitted within the cradle and supported by the bottom wall and sidewalls of the cradle, a funnel having a neck portion, and an interior space free from movable components, said funnel being supported by the sidewalls of said cradle with the neck portion disposed in fixed positional relationship above and aligned with the open end of the capsule, a plug of fusible material sealing the neck of the funnel, a solution of radioactive salt disposed in the funnel in contact with the plug so that the plug constitutes the sole means blocking outflow of the solution of radioactive salt from the funnel into the capsule, and means for heating the solution to evaporate the solution to a salt and for fusing the plug whereby salt obtained by evaporation of the solution to dryness in the funnel runs into said capsule when the temperature is raised to fuse the plug.

References Cited in the file of this patent
UNITED STATES PATENTS

| | | |
|---|---|---|
| 493,047 | Simpson | Mar. 7, 1893 |
| 1,364,287 | Leavitt | Jan. 4, 1921 |
| 1,773,401 | Lovekin | Aug. 19, 1930 |
| 1,883,211 | Wilson | Oct. 18, 1932 |
| 2,022,037 | Hanchett | Nov. 26, 1935 |
| 2,744,629 | Vine | May 8, 1956 |
| 2,800,177 | Miller | July 23, 1957 |

FOREIGN PATENTS

| | | |
|---|---|---|
| 866,231 | Germany | Feb. 9, 1953 |